United States Patent
Kikuchi

(10) Patent No.: US 10,566,910 B2
(45) Date of Patent: Feb. 18, 2020

(54) ISOLATED SYNCHRONOUS RECTIFYING DC/DC CONVERTER

(71) Applicant: ROHM CO., LTD., Kyoto (JP)

(72) Inventor: Hiroki Kikuchi, Kyoto (JP)

(73) Assignee: ROHM CO., LTD., Kyoto (JP)

(*) Notice: Subject to any disclaimer, the term of this patent is extended or adjusted under 35 U.S.C. 154(b) by 0 days.

(21) Appl. No.: 16/246,816

(22) Filed: Jan. 14, 2019

(65) Prior Publication Data
US 2019/0222134 A1    Jul. 18, 2019

(30) Foreign Application Priority Data
Jan. 17, 2018 (JP) .................. 2018-005620

(51) Int. Cl.
*H02M 3/335* (2006.01)

(52) U.S. Cl.
CPC .............. *H02M 3/33592* (2013.01)

(58) Field of Classification Search
CPC ......... H02M 2001/0006; H02M 3/335; H02M 3/33523; H02M 3/33553; H02M 3/33576; H02M 3/33592; H02M 1/32; H02M 3/22; H02M 3/24; H02M 3/325; H02M 3/28; H02M 3/33569; H02M 3/33507; H02M 3/33538; H02M 3/33546; H02M 3/33515; H02M 1/08; H02M 1/36; H02M 1/083; H02M 2007/4815; H02M 2007/4818; Y02B 70/1491

See application file for complete search history.

(56) References Cited

U.S. PATENT DOCUMENTS

| | | | |
|---|---|---|---|
| 7,345,896 B2 * | 3/2008 | Dalal | H02M 3/33592 323/902 |
| 7,408,796 B2 * | 8/2008 | Soldano | H02M 3/33592 363/127 |
| 8,102,680 B2 * | 1/2012 | Ren | H02M 3/33592 363/21.06 |
| 8,625,313 B2 * | 1/2014 | Yeh | H02M 1/083 363/21.13 |
| 10,075,081 B2 * | 9/2018 | Kikuchi | H02M 3/33523 |
| 10,075,084 B2 * | 9/2018 | Kikuchi | H02M 1/32 |
| 2004/0125621 A1 * | 7/2004 | Yang | H02M 3/33592 363/21.14 |

(Continued)

FOREIGN PATENT DOCUMENTS

JP    2009159721 A    7/2009

*Primary Examiner* — Adolf D Berhane
*Assistant Examiner* — Nusrat Quddus
(74) *Attorney, Agent, or Firm* — Cantor Colburn LLP

(57) ABSTRACT

A synchronous rectification controller includes: a drain terminal connected to a drain of a synchronous rectification transistor; a first comparator configured to compare a drain voltage of the drain terminal with a first threshold voltage; a second comparator configured to compare the drain voltage of the drain terminal with a second threshold voltage; a flip-flop to which an ON signal output from the first comparator and an OFF signal output from the second comparator are input; a driver configured to output a gate signal to the synchronous rectification transistor based on an output signal of the flip-flop; and a threshold adjusting part configured to adjust the second threshold voltage based on the drain voltage.

16 Claims, 6 Drawing Sheets

(56) References Cited

U.S. PATENT DOCUMENTS

| | | | | |
|---|---|---|---|---|
| 2010/0085675 A1* | 4/2010 | Oki | ........................ | H02M 1/08 |
| | | | | 361/101 |
| 2012/0248984 A1* | 10/2012 | Hu | ....................... | H05B 41/295 |
| | | | | 315/116 |
| 2014/0003096 A1* | 1/2014 | Deng | ................ | H02M 3/33592 |
| | | | | 363/21.14 |
| 2015/0326008 A1* | 11/2015 | Baurle | ................. | H02H 1/0084 |
| | | | | 361/87 |
| 2015/0365006 A1* | 12/2015 | Choi | ................ | H02M 3/33592 |
| | | | | 363/21.02 |
| 2019/0222132 A1* | 7/2019 | Kikuchi | ............ | H02M 3/33592 |
| 2019/0229634 A1* | 7/2019 | Moon | ................... | H02M 1/083 |

\* cited by examiner

ISOLATED SYNCHRONOUS RECTIFYING DC/DC CONVERTER

CROSS-REFERENCE TO RELATED APPLICATION

The present application claims priority under 35 U.S.C. § 119 to Japanese Patent Application No. 2018-005620, filed on Jan. 17, 2018, the entire contents of which are incorporated herein by reference.

TECHNICAL FIELD

The present disclosure relates to an isolated synchronous rectifying DC/DC converter.

BACKGROUND

An isolated synchronous rectifying DC/DC converter is utilized for various power source circuits including an AC/DC converter. As a kind of isolated synchronous rectifying DC/DC converter, an LLC converter is used.

FIG. 5 is a circuit diagram illustrating an example of a partial configuration of a secondary side of an LLC converter. A secondary winding W200 illustrated in FIG. 5 is included in a transformer Tr. A primary side (not shown) of the LLC converter includes a primary winding of the transformer Tr, a switching transistor, a primary side controller that drives the switching transistor, and the like.

One end of the secondary winding W200 is connected to an output terminal P200, and the other end of the secondary winding W200 is connected to a drain of a synchronous rectification transistor M200. A source of the synchronous rectification transistor M200 is connected to a ground application terminal. An output capacitor C200 is connected between the output terminal P200 and a ground.

The LLC converter has a synchronous rectification controller 300S on the secondary side. The synchronous rectification controller 300S has a gate terminal Tg1, a drain terminal Td1, a source terminal Tg2, and a drain terminal Td2 as external terminals. A gate of the synchronous rectification transistor M200 is connected to the gate terminal Tg1. The drain of the synchronous rectification transistor M200 is connected to the drain terminal Td1. The gate terminal Tg2 and the drain terminal Td2 are respectively connected to a gate and a drain of another synchronous rectification transistor (not shown) which may be provided in addition to the synchronous rectification transistor M200 on the secondary side.

The synchronous rectification controller 300S outputs a gate signal SG2 from the gate terminal Tg1 based on a drain voltage VDS2 generated at the drain terminal Td1, and controls switching of the synchronous rectification transistor M200. By the switching of the switching transistor on the primary side and the switching of the synchronous rectification transistor M200 on the secondary side, an input voltage applied to the primary winding is converted into an output voltage and output from the output terminal P200.

FIG. 7 is a timing chart illustrating a switching control of the synchronous rectification transistor M200 in the circuit illustrated in FIG. 5. In FIG. 7, a current IS2 flowing through the synchronous rectification transistor M200, the drain voltage VDS2, and the gate signal SG2 are shown sequentially from the top side.

When the switching transistor on the primary side is switched at timing t10 of FIG. 7 where the synchronous rectification transistor M200 is in an OFF state, the drain voltage VDS2 drops from a positive voltage to a negative voltage. Accordingly, the current IS2 starts to flow through a body diode BD of the synchronous rectification transistor M200. The current IS2 is a resonance current and has a sinusoidal form.

When the synchronous rectification controller 300S detects that the drain voltage VDS2 has become a negative voltage as described above, the synchronous rectification controller 300S sets the gate signal SG2 to an ON level and turns on the synchronous rectification transistor M200 (timing t11). Accordingly, the drain voltage VDS2 is changed to a voltage value (IS2×Ron) based on an on-resistance of the synchronous rectification transistor M200 and the current IS2.

When the synchronous rectification controller 300S detects that the drain voltage VDS2 has become equal to or higher than a predetermined threshold value Vth at timing t12, the synchronous rectification controller 300S sets the gate signal SG2 to an OFF level and turns off the synchronous rectification transistor M200. Thereafter, the current IS2 flows through the body diode BD until the current IS2 becomes zero at timing t13.

However, a state of the circuit in FIG. 5 described above is an ideal state, and actually, as illustrated in FIG. 6, a parasitic inductor L exists between the drain of the synchronous rectification transistor M200 and a connection node N2 to which the drain terminal Td1 is connected. The parasitic inductor L is generated by a substrate pattern, a bonding wire and lead of the synchronous rectification transistor M200, or the like.

Therefore, the drain voltage VDS2 becomes a value obtained by adding an induced voltage ΔVL generated in the parasitic inductor L to a drain-source voltage ΔVDS of the synchronous rectification transistor M200. The induced voltage ΔVL is $\Delta VL = L \times di/dt$.

FIG. 8 is a timing chart illustrating a switching control of the synchronous rectification transistor M200 in the circuit illustrated in FIG. 6. In FIG. 8, the current IS2 flowing through the synchronous rectification transistor M200, the drain-source voltage ΔVDS, the induced voltage ΔVL, the drain voltage VDS2, and the gate signal SG2 are shown sequentially from the top side.

When the switching transistor on the primary side is switched at timing t20 of FIG. 8, the drain-source voltage ΔVDS is changed from a positive voltage to a negative voltage, and the current IS2 starts to flow through the body diode BD. The induced voltage ΔVL, which is a negative voltage, is generated by a temporal slope di/dt of the increasing current IS2. The drain voltage VDS2 is a sum of the drain-source voltage ΔVDS and the induced voltage ΔVL.

When the synchronous rectification controller 300S detects that the drain voltage VDS2 has become a negative voltage, the synchronous rectification controller 300S sets the gate signal SG2 to an ON level and turns on the synchronous rectification transistor M200 (timing t21). Accordingly, the drain-source voltage ΔVDS is changed to a voltage value based on the on-resistance of the synchronous rectification transistor M200 and the current IS2.

The induced voltage ΔVL becomes zero at timing t22 where the current IS2 reaches a peak, and thereafter, the induced voltage ΔVL rises to a positive voltage by a decrease of the current IS2. Accordingly, the drain voltage VDS2, which is a value obtained by adding the induced voltage ΔVL of the positive voltage to the drain-source voltage ΔVDS, becomes equal to or higher than the threshold voltage Vth at timing t23, which is earlier than the timing t12 illustrated in FIG. 7 described above. Thus, at a timing earlier than that in FIG. 7, the gate signal SG2 becomes an OFF level and the synchronous rectification transistor M200 is turned off. Thereafter, the current IS2 flows through the body diode BD until the current IS2 becomes zero at timing t24.

As described above, due to the existence of the parasitic inductor L in the actual LLC converter, there was a problem that the timing when the synchronous rectification transistor M200 is turned off arrives earlier, which results in efficiency reduction. There was also a problem that influence of the parasitic inductor L on the efficiency increases as a load (i.e., the peak of the sinusoidal current IS2) increases.

SUMMARY

Some embodiments of the present disclosure provide an isolated synchronous rectifying DC/DC converter capable of suppressing efficiency reduction.

According to one embodiment of the present disclosure, there is provided an isolated synchronous rectifying DC/DC converter configured as an LLC converter includes a synchronous rectification transistor disposed on a secondary side of the DC/DC converter and a synchronous rectification controller configured to control driving of the synchronous rectification transistor, wherein the synchronous rectification controller includes: a drain terminal connected to a drain of the synchronous rectification transistor; a first comparator configured to compare a drain voltage of the drain terminal with a first threshold voltage; a second comparator configured to compare the drain voltage of the drain terminal with a second threshold voltage; a flip-flop to which an ON signal output from the first comparator and an OFF signal output from the second comparator are input; a driver configured to output a gate signal to the synchronous rectification transistor based on an output signal of the flip-flop; and a threshold adjusting part configured to adjust the second threshold voltage based on the drain voltage (first configuration).

In the first configuration, the threshold adjusting part may include a sample hold circuit configured to sample and hold the drain voltage, and may be configured to adjust the second threshold voltage based on a sampling voltage output from the sample hold circuit (second configuration).

In the first or the second configuration, the threshold adjusting part may further include at a front stage of the sample hold circuit: a V/I conversion circuit configured to perform voltage-current conversion on the drain voltage; a first current mirror circuit receiving an output of the V/I conversion circuit as an input current; and a first resistor through which an output current of the first current mirror circuit flows (third configuration).

In the second or the third configuration, the threshold adjusting part may include a delay circuit to which an output of the flip-flop is input, and a sampling mode and a hold mode of the sample hold circuit may be switched according to a delayed signal output from the delay circuit (fourth configuration).

In the fourth configuration, a delay time of the delay circuit may be near half of a period of a current flowing through the synchronous rectification transistor (fifth configuration).

In any one of the second to the fourth configurations, the synchronous rectification controller may further include a threshold setting terminal to which a setting resistor is connected, the threshold adjusting part may further include a constant voltage circuit configured to control an output voltage to the sampling voltage, and the output voltage may be applied to the threshold setting terminal (sixth configuration).

In the sixth configuration, the threshold adjusting part may further include: a second current mirror circuit receiving a current flowing through the setting resistor as an input current; and a second resistor through which an output current of the second current mirror circuit flows so that a predetermined voltage is applied to one end of the second resistor (seventh configuration).

DETAILED DESCRIPTION

One embodiment of the present disclosure will be now described in detail with reference to the drawings.

<Overall Configuration of LLC Converter>

Figure 1:
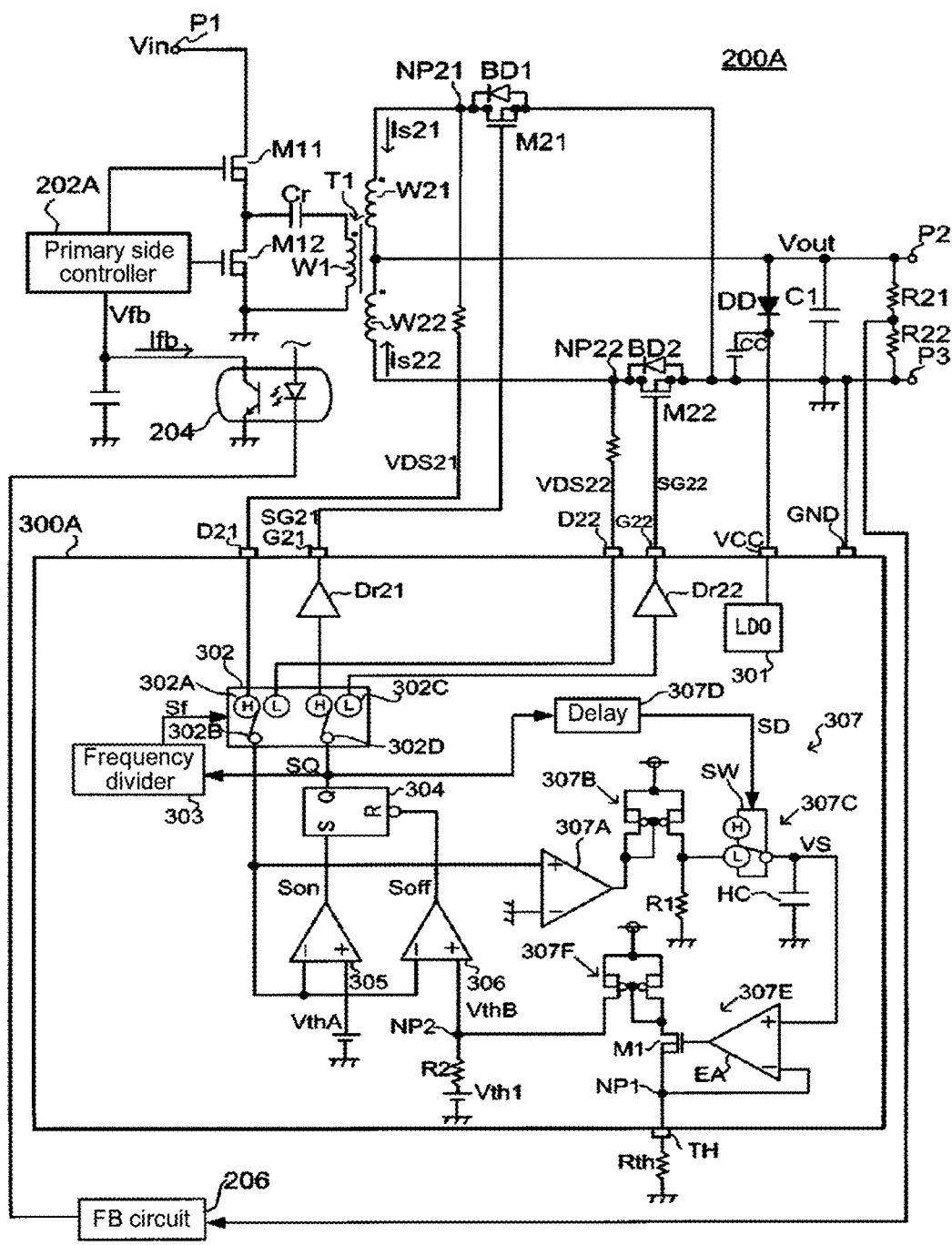
FIG. 1 is a circuit diagram of a DC/DC converter according to one embodiment of the present disclosure.

FIG. 1 is a circuit diagram of a DC/DC converter 200A according to one embodiment of the present disclosure. The DC/DC converter 200A is an isolated synchronous rectifying DC/DC converter as an LLC converter. The DC/DC converter 200A generates an output voltage Vout based on an input voltage Vin applied to an input terminal P1 and outputs the output voltage Vout from an output terminal P2.

The DC/DC converter 200A has a primary side configuration that includes switching transistors M11 and M12, a primary side controller 202A, a resonance capacitor Cr, and a primary winding W1 of a transformer T1. The DC/DC converter 200A has a secondary side configuration that includes secondary windings W21 and W22 of the transformer T1, first and second synchronous rectification transistors M21 and M22, an output capacitor C1, resistors R21 and R22, a diode DD, a capacitor CC, and a synchronous rectification controller 300A.

A drain of the switching transistor M11 is connected to the input terminal P1 to which the DC input voltage Vin is applied. A source of the switching transistor M11 is connected to a drain of the switching transistor M12. A source of the switching transistor M12 is connected to a ground application terminal. One end of the resonance capacitor Cr is connected to a connection node to which the switching transistor M11 and the switching transistor M12 are connected. The other end of the resonance capacitor Cr is connected to one end of the primary winding W1. The other end of the primary winding W1 is connected to the source of the switching transistor M12.

The primary side controller 202A controls switching of the switching transistors M11 and M12 by outputting a driving signal to gates of the switching transistors M11 and M12.

One end of the secondary winding W21 is connected to a drain of the first synchronous rectification transistor M21. The first synchronous rectification transistor M21 has a body diode BD1. A source of the first synchronous rectification transistor M21 is connected to a ground terminal P3. The ground terminal P3 is connected to a ground application terminal.

The other end of the secondary winding W21 is connected to one end of the secondary winding W22. The other end of the secondary winding W22 is connected to a drain of the second synchronous rectification transistor M22. The second synchronous rectification transistor M22 has a body diode BD2. A source of the second synchronous rectification transistor M22 is connected to the ground terminal P3.

A connection node to which the secondary winding W21 and the secondary winding W22 are connected is connected to the output terminal P2. The output capacitor C1 is connected between the output terminal P2 and the ground terminal P3. The resistor R21 and the resistor R22 are connected in series between the output terminal P2 and the ground terminal P3. A feedback (FB) circuit 206 is connected to a connection node to which the resistors R21 and R22 are connected.

The FB circuit 206 has, for example, a shunt regulator and the like, and drives a light emitting element of a photocoupler 204 with a current corresponding to an error between a voltage obtained by dividing the output voltage Vout by the resistors R21 and R22 and a predetermined target voltage. A feedback current Ifb corresponding to the error flows through a light receiving element of the photocoupler 204. A feedback signal Vfb corresponding to the feedback current Ifb is generated at a feedback (FB) pin of the primary side controller 202A. The primary side controller 202A drives the switching transistors M11 and M12 based on the feedback signal Vfb.

The synchronous rectification controller 300A includes a low dropout (LDO) regulator 301, a selector 302, a frequency divider 303, a flip-flop 304, a first comparator 305, a second comparator 306, a threshold adjusting part 307, a first driver Dr21, and a second driver Dr22, which are received in one package.

The synchronous rectification controller 300A further includes a first drain terminal D21, a first gate terminal G21, a second drain terminal D22, a second gate terminal G22, a power terminal VCC, a ground terminal GND, and a threshold setting terminal TH, which establish electrical connection with external devices.

The first drain terminal D21 to which the drain of the first synchronous rectification transistor M21 is connected is connected to one terminal of an input terminal 302A of the selector 302. The second drain terminal D22 to which the drain of the second synchronous rectification transistor M22 is connected is connected to the other terminal of the input terminal 302A. An output terminal 302B of the selector 302 is connected to an inverting input terminal (−) of each of the first comparator 305 and the second comparator 306. The selector 302 switches between conduction of a path from the first drain terminal D21 to the output terminal 302B and conduction of a path from the second drain terminal D22 to the output terminal 302B. That is to say, the selector 302 selects which of a drain voltage VDS21 of the first drain terminal D21 and a drain voltage VDS22 of the second drain terminal D22 to be detected by the first comparator 305 and the second comparator 306.

A first threshold voltage VthA is applied to a non-inverting input terminal (+) of the first comparator 305. The first threshold voltage VthA is based on a ground potential. An output terminal of the first comparator 305 is connected to a set terminal of the flip-flop 304. The first comparator 305 detects that the drain voltages VDS21 and VDS22 have dropped to a negative voltage, which is caused by turning on the switching transistors M11 and M12, by detecting that the drain voltages VDS21 and VDS22 have become equal to or lower than the first threshold voltage VthA (e.g., −200 mV). At this time, the first comparator 305 asserts an ON signal Son. The first synchronous rectification transistor M21 and the second synchronous rectification transistor M22 are turned on according to the asserted ON signal Son.

A second threshold voltage VthB is applied to a non-inverting input terminal (+) of the second comparator 306. The second threshold voltage VthB is adjusted by the threshold adjusting part 307, as will be described later. An output terminal of the second comparator 306 is connected to a reset terminal of the flip-flop 304. The second comparator 306 detects a zero current, i.e., detects that currents Is21 and Is22 flowing by the first synchronous rectification transistor M21 and the second synchronous rectification transistor M22, which are turned on, become substantially zero, by detecting that the drain voltages VDS21 and VDS22 have become equal to or higher than the second threshold voltage VthB (e.g., −6 mV). At this time, the second comparator 306 asserts an OFF signal Soff. The first synchronous rectification transistor M21 and the second synchronous rectification transistor M22 are turned off according to the asserted OFF signal Soff.

Figure 2:
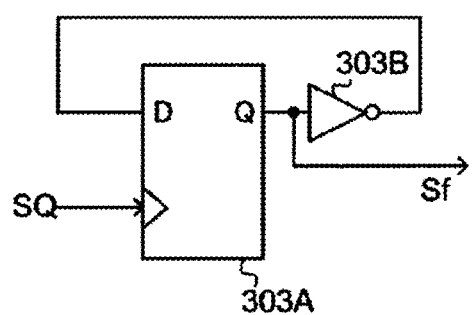
FIG. 2 is a circuit diagram illustrating one configuration example of a frequency divider.

A Q output terminal of the flip-flop 304 is connected to an input terminal of the frequency divider 303. The frequency divider 303 has, for example, a configuration illustrated in FIG. 2, and includes a D flip-flop 303A and an inverter 303B. A Q output signal SQ from the flip-flop 304 is input to a clock terminal of the D flip-flop 303A. An input terminal of the inverter 303B is connected to a Q output terminal of the D flip-flop 303A. An output terminal of the inverter 303B is connected to a D input terminal of the D flip-flop 303A.

With this configuration, a frequency divider output signal Sf output from the Q output terminal of the D flip-flop 303A is switched between High and Low at every falling timing of the Q output signal SQ from High to Low. The frequency divider 303 outputs the frequency divider output signal Sf by doubling a cycle of the Q output signal SQ input to the frequency divider 303.

The frequency divider output signal Sf is output to the selector 302. The selector 302 switches between the input terminal 302A and the output terminal 302B and between an input terminal 302D and an output terminal 302C according to a level of the frequency divider output signal Sf. One terminal of the output terminal 302C is connected to an input terminal of the first driver Dr21. An output terminal of the first driver Dr21 is connected to the gate of the first synchronous rectification transistor M21 via the first gate terminal G21. The first driver Dr21 outputs a gate signal SG21 having a level switched according to a level of the input signal.

The other terminal of the output terminal 302C is connected to an input terminal of the second driver Dr22. The output terminal of the second driver Dr22 is connected to the gate of the second synchronous rectification transistor M22 via the second gate terminal G22. The second driver Dr22 outputs a gate signal SG22 having a level switched according to the level of the input signal.

The conduction of a path from the input terminal 302D to the first driver Dr21 and the conduction of a path from the input terminal 302D to the second driver Dr22 are switched by the selector 302. The Q output signal SQ is input to the input terminal 302D. Thus, the selector 302 selects one of the first driver Dr21 and the second driver Dr22 to which the Q output signal SQ is input.

An anode of the diode DD is connected to the output terminal P2. A cathode of the diode DD is connected to one end of the capacitor CC and the power terminal VCC. The other end of the capacitor CC is connected to the ground terminal P3. The LDO regulator 301 generates and outputs an internal voltage based on the input voltage applied to the power terminal VCC. A part of the internal voltage is supplied to high potential sides of the first driver Dr21 and the second driver Dr22.

The threshold adjusting part 307 is a circuit for adjusting the second threshold voltage VthB, details of which will be described later.

<Basic Operation of LLC Converter>

Next, an operation of the DC/DC converter 200A configured as described above will be described.

Figure 3:
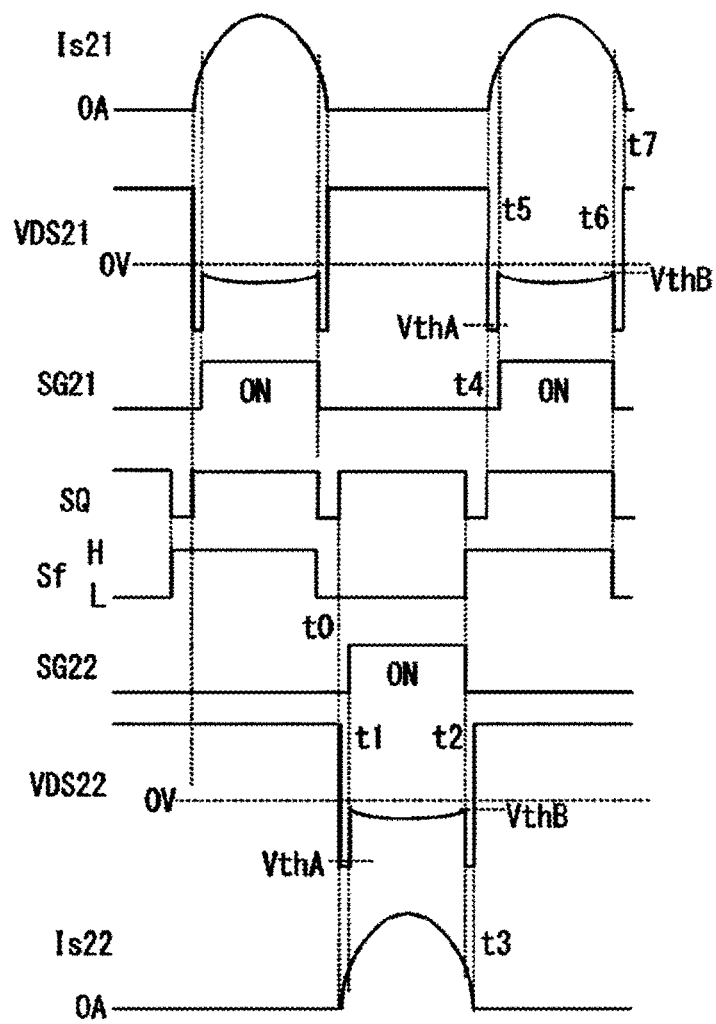
FIG. 3 is a timing chart illustrating a normal operation of the DC/DC converter according to one embodiment of the present disclosure.

Here, description will be made with reference to a timing chart illustrated in FIG. 3. In FIG. 3, the current Is21, the drain voltage VDS21, the gate signal SG21, the Q output signal SQ, the frequency divider output signal Sf, the gate signal SG22, the drain voltage VDS22, and the current Is22 are indicated sequentially from the top side.

Before timing t0, the frequency divider output signal Sf is Low, and the drain voltage VDS22 of the second drain terminal D22 as a detection target and the second driver Dr22 as an output destination of the Q output signal SQ are selected by the selector 302. Then, when the switching transistor M11 is turned on at the timing t0, the drain voltage VDS22 drops to a negative voltage and the current Is22 starts to flow through the body diode BD2. The current Is22 is a resonance current, and has a sinusoidal form.

The first comparator 305 detects that the drain voltage VDS22 has dropped to a negative voltage, and asserts the ON signal Son. Accordingly, the Q output signal SQ is switched to High, the gate signal SG22 becomes an ON level by the second driver Dr22, and the second synchronous rectification transistor M22 is turned on at timing t1. Thus, the current Is22 starts to flow from the source to the drain of the second synchronous rectification transistor M22.

The drain voltage VDS22 is changed to a voltage value (Is22×Ron22) based on the current Is22 and an on-resistance of the synchronous rectification transistor M22. As will be described later, a parasitic inductor also affects the drain voltage VDS22.

Then, at timing t2, the second comparator 306 detects that the current Is22 has become a zero current based on the drain voltage VDS22, and asserts the OFF signal Soff. That is to say, the drain voltage VDS22 at this time becomes equal to or higher than the second threshold voltage VthB. Accordingly, the Q output signal SQ is switched to Low, the gate signal SG22 becomes an OFF level, and the second synchronous rectification transistor M22 is turned off. At this time, the frequency divider output signal Sf is switched to High. Accordingly, the drain voltage VDS21 of the first drain terminal D21 as the detection target and the first driver Dr21 as the output destination of the Q output signal SQ are selected by the selector 302.

In the second synchronous rectification transistor M22 which is turned off, the current Is22 continues to flow through the body diode BD2. The current Is22 does not flow at timing t3.

Then, when the switching transistor M12 is turned on at timing t4, the drain voltage VDS21 drops to a negative voltage and the current Is21 starts to flow through the body diode BD1. The current Is21 is a resonance current, and has a sinusoidal form.

The first comparator 305 detects that the drain voltage VDS21 has dropped to a negative voltage, and asserts the ON signal Son. Accordingly, the Q output signal SQ is switched to High, the gate signal SG21 become an ON level by the second driver Dr21, and the first synchronous rectification transistor M21 is turned on at timing t5. Thus, the current Is21 starts to flow from the source to the drain of the first synchronous rectification transistor M21.

The drain voltage VDS21 is changed to a voltage value (Is21×Ron21) based on the current Is21 and an on-resistance of the first synchronous rectification transistor M21. As will be described later, a parasitic inductor also affects the drain voltage VDS21.

Then, at timing t6, the second comparator 306 detects that the current Is21 has become a zero current based on the drain voltage VDS21, and asserts the OFF signal Soff. That is to say, the drain voltage VDS21 at this time becomes equal to or higher than the second threshold VthB. Accordingly, the Q output signal SQ is switched to Low, the gate signal SG21 becomes an OFF level, and the first synchronous rectification transistor M21 is turned off. At this time, the frequency divider output signal Sf is switched to Low. Accordingly, the drain voltage VDS22 of the second drain terminal D22 as the detection target and the second driver Dr22 as the output destination of the Q output signal SQ are selected by the selector 302.

In the first synchronous rectification transistor M21 which is turned off, the current Is21 continues to flow through the body diode BD1. The current Is21 does not flow at timing t7. Thereafter, the same repetitive operation is performed.

<About Threshold Adjusting Part>

Next, the threshold adjusting part 307 will be described in detail. The threshold adjusting part 307 has a V/I conversion circuit 307A, a current mirror circuit 307B, a sample hold circuit 307C, a delay circuit 307D, a constant voltage circuit 307E, a current mirror circuit 307F, and resistors R1 and R2.

The output terminal 302B of the selector 302 is connected to one input terminal of the V/I conversion circuit 307A. That is to say, the V/I conversion circuit 307A performs voltage-current conversion on selected one of the input drain voltages VDS21 and VDS22, and outputs the conversion result. An output of the V/I conversion circuit 307A is input to an input terminal of the current mirror circuit 307B. An output terminal of the current mirror circuit 307B is connected to one end of the resistor R1. The other end of the resistor R1 is connected to a ground application terminal. The current mirror circuit 307B mirrors an input current from the V/I conversion circuit 307A at a predetermined magnification and allows an output current to flow through the resistor R1. Thus, a voltage corresponding to the output current is generated across the resistor R1.

The sample hold circuit 307C has a sampling switch SW and a hold capacitor HC. One input terminal of the sampling switch SW is connected to a connection node to which the output terminal of the current mirror circuit 307B and one end of the resistor R1 are connected. One end of the hold capacitor HC is connected to an output terminal of the sampling switch SW. The other input terminal of the sampling switch SW is open.

The Q output signal SQ is input to the delay circuit 307D. The delay circuit 307D outputs a delayed signal SD, which is obtained by delaying the input Q output signal SQ by a predetermined time period, to the sampling switch SW. The sampling switch SW performs switching based on the delayed signal SD.

Specifically, when the delayed signal SD is Low, one input terminal of the sampling switch SW, namely the connection node between the current mirror circuit 307B and the resistor R1, and the output terminal of the sampling switch SW are conducted. At this time, the sample hold circuit 307C enters a sampling mode in which a voltage generated at the connection node is directly output from the sampling switch SW.

On the other hand, when the delayed signal SD is High, the other input terminal and the output terminal of the sampling switch SW are conducted, and the output terminal is open. At this time, the sample hold circuit 307C enters a hold mode in which the voltage at the output terminal immediately before the sampling switch SW is switched is held by the hold capacitor HC.

The constant voltage circuit 307E has an error amplifier EA and a transistor M1. A sampling voltage VS, which is an output of the sample hold circuit 307C, is input to a non-inverting input terminal (+) of the error amplifier EA. An inverting input terminal (−) of the error amplifier EA is connected to a source of the transistor M1. An output terminal of the error amplifier EA is connected to a gate of the transistor M1. A voltage of a connection node NP1, to which the inverting input terminal of the error amplifier EA and the source of the transistor M1 are connected, is controlled to be constant by the constant voltage circuit 307E to the input sampling voltage VS.

One end of an external setting resistor Rth is connected to the connection node NP1 via the threshold setting terminal TH. A drain of the transistor M1 is connected to an input terminal of the current mirror circuit 307F. A current generated by the voltage generated at the connection node NP1 and the setting resistor Rth becomes an input current of the current mirror circuit 307F. The current mirror circuit 307F mirrors and outputs the input current at a predetermined magnification.

An output terminal of the current mirror circuit 307F is connected to a connection node NP2 to which one end of the resistor R2 and the non-inverting input terminal (+) of the second comparator 306 are connected. A predetermined voltage Vth1 is applied to the other end of the resistor R2. Since the output current from the current mirror circuit 307F flows through the resistor R2, the second threshold voltage VthB is generated at the connection node NP2.

With this configuration, the second threshold voltage VthB may be expressed by the following equation (1):

$$VthB=(VS/Rth) \times N \times R2 + Vth1, \quad \text{Equation (1)}$$

wherein N is a predetermined magnification of mirroring in the current mirror circuit 307F.

When the second synchronous rectification transistor M22 is turned on, the drain voltage VDS22 is influenced by a parasitic inductor L22 existing between the drain of the second synchronous rectification transistor M22 and the connection node NP22 between the drain of the second synchronous rectification transistor M22 and the second drain terminal D22. That is to say, the drain voltage VDS22 becomes a value obtained by adding an induced voltage ΔVL (=L22×di/dt) caused by the parasitic inductor L22 to a drain-source voltage ΔVDS of the second synchronous rectification transistor M22.

Similarly, when the first synchronous rectification transistor M21 is turned on, the drain voltage VDS21 is influenced by a parasitic inductor L21 existing between the drain of the first synchronous rectification transistor M21 and a connection node NP21 between the drain of the first synchronous rectification transistor M21 and the first drain terminal D21. That is to say, the drain voltage VDS21 becomes a value obtained by adding an induced voltage ΔVL (=L21×di/dt) caused by the parasitic inductor L21 to a drain-source voltage ΔVDS of the first synchronous rectification transistor M21.

The currents Is22 and Is21 have a sinusoidal form, and a peak of each of the currents Is22 and Is2 varies according to a load. Therefore, the temporal slopes (di/dt) of the currents Is22 and Is21 vary according to the load and affect the drain voltages VDS22 and VDS21. The sampling voltage VS is obtained by sample-holding the drain voltages VDS22 and VDS21, and indicates the magnitude of the load. Therefore, according to the above Equation (1), the second threshold voltage VthB is adjusted to be larger as the sampling voltage VS increases, namely as the load increases. This makes it possible to adjust turning-off timings of the synchronous rectification transistors M22 and M21 by the second comparator 306 according to the load, and to suppress efficiency reduction.

In addition, as can be seen from the above Equation (1), it is possible to set a correction factor corresponding to the parasitic inductor by the external setting resistor Rth.

<Specific Example of Threshold Voltage Adjustment>

Here, a specific example of adjusting the second threshold voltage VthB by the threshold adjusting part 307 will be described with reference to a timing chart illustrated in FIG. 4. Although a case of turning on and turning off the second synchronous rectification transistor M22 will be described herein, the same can be applied to the first synchronous rectification transistor M21.

Figure 4:
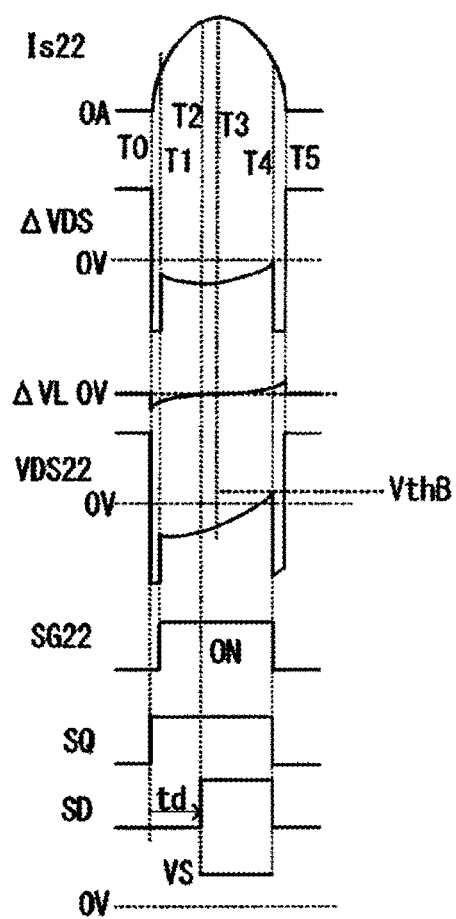
FIG. 4 is a timing chart illustrating an example of adjusting a second threshold voltage according to one embodiment of the present disclosure.
Figure 5:
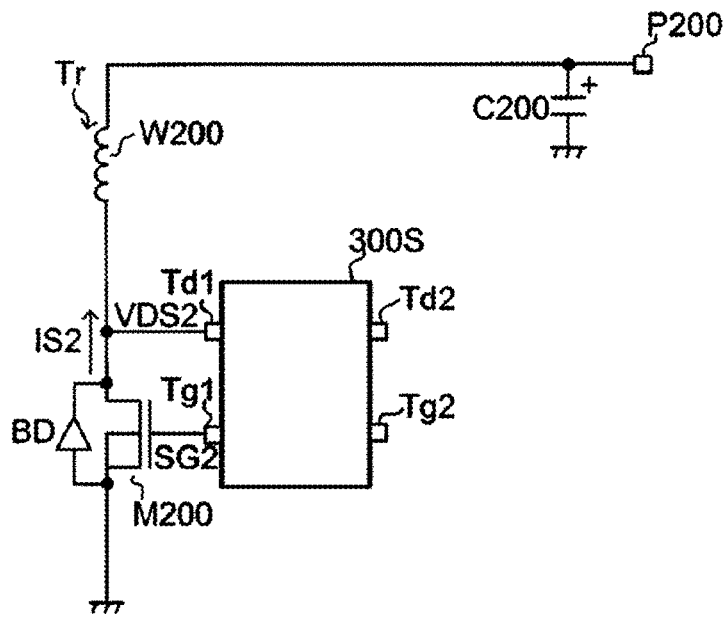
FIG. 5 is a circuit diagram illustrating an example of a partial configuration of a secondary side of an LLC converter.
Figure 6:
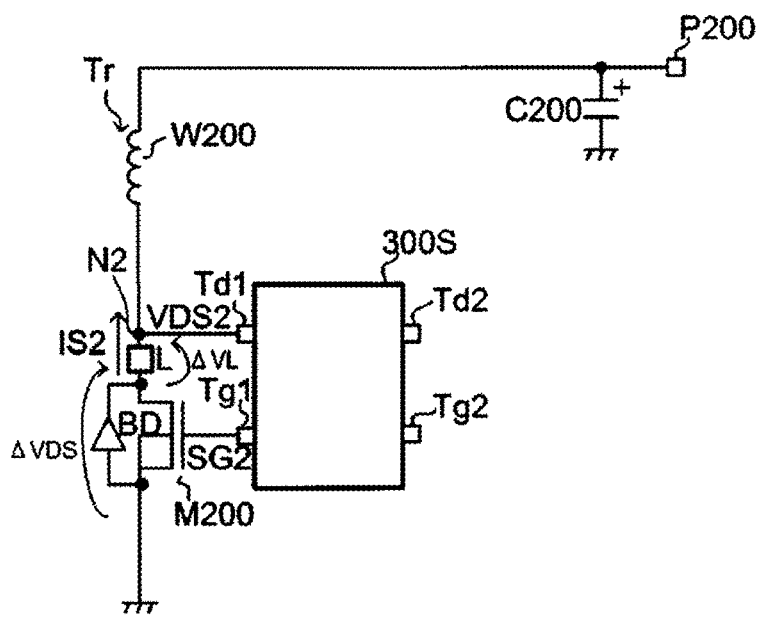
FIG. 6 is a circuit diagram illustrating an example of a partial configuration of a secondary side of an LLC converter, where a parasitic inductor is considered.
Figure 7:
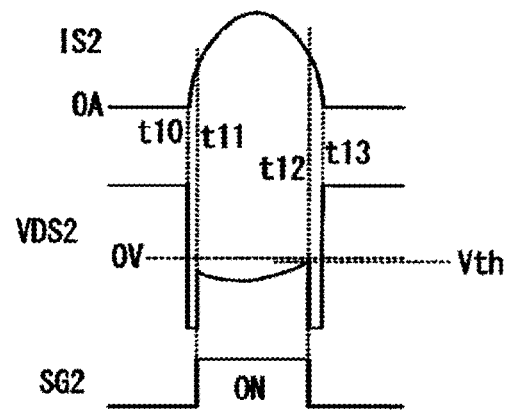
FIG. 7 is a timing chart illustrating a switching control of a synchronous rectification transistor in the circuit illustrated in FIG. 5.
Figure 8:
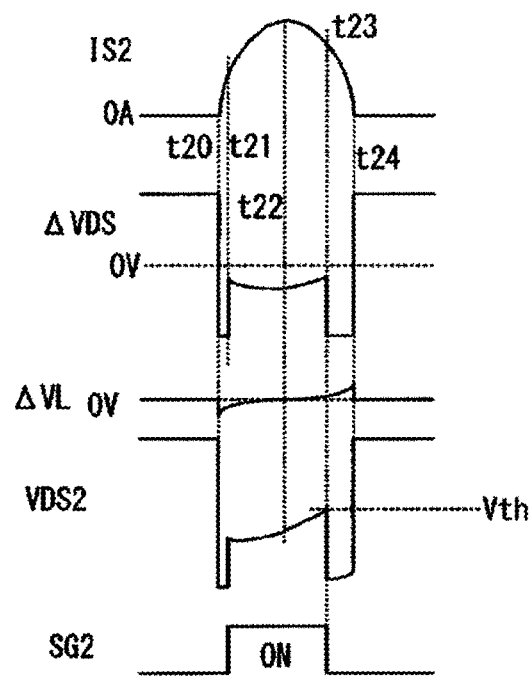
FIG. 8 is a timing chart illustrating a switching control of a synchronous rectification transistor in the circuit illustrated in FIG. 6.

In FIG. 4, the current Is22, the drain-source voltage ΔVDS of the second synchronous rectification transistor M22, the induced voltage ΔVL by the parasitic inductor L22 existing between the connection node NP22 and the drain of the second synchronous rectification transistor M22, the drain voltage VDS22, the gate signal SG22, the Q output signal SQ, the delayed signal SD, and the sampling voltage VS are shown sequentially from the top side. The drain voltage VDS22 is a voltage value obtained by adding the drain-source voltage ΔVDS and the induced voltage ΔVL.

At timing T0 of FIG. 4, when the drain-source voltage ΔVDS drops to a negative voltage, the current Is22 starts to flow through the body diode BD2. Since the current Is22 increases, the induced voltage ΔVL is generated as a negative voltage. When the first comparator 305 detects that the drain-source voltage ΔVDS has dropped to a negative voltage based on the drain voltage VDS22, the first comparator 305 asserts the ON signal Son. Accordingly, the Q output signal SQ rises to High, the gate signal SG22 becomes an ON level, and the synchronous rectification transistor M22 is turned on at timing T1.

Thereafter, the drain-source voltage ΔVDS is changed to a voltage value (Is22×Ron) based on the current Is22 and the on-resistance of the synchronous rectification transistor M22, and the induced voltage ΔVL is changed to a voltage value (L22×di/dt) corresponding to the temporal slope of the current Is22. The drain voltage VDS22 is a voltage obtained by adding the drain-source voltage ΔVDS and the induced voltage ΔVL.

At timing T3, the current Is22 reaches a peak and the induced voltage ΔVL becomes zero. At timing T2 delayed from the rise of the Q output signal SQ to High by a delay time td (e.g., 2 μs), the delayed signal SD rises to High. The timing T2 is near the timing T3. In some embodiments, the delay time td may be set to a value (e.g., 2 μs) near half of a period (e.g., 5 μs) of the sinusoidal current Is22.

The sampling switch SW is switched by the rise of the delayed signal SD, and the sample hold circuit 307C holds the sampling voltage VS. That is to say, the delay circuit 307D can hold the drain voltage VDS22 at a timing near the peak of the current Is22. In FIG. 4, for the sake of convenience, only a voltage during the holding mode is shown for the sampling voltage VS, and illustration of the sampling voltage Vs during the sampling mode is omitted.

Based on the sampling voltage VS held at the timing T2, the second threshold voltage VthB is set by the above Equation (1). After the timing T3, since the current Is22 decreases, the induced voltage ΔVL rises to a positive voltage. The induced voltage ΔVL is added to the drain-source voltage ΔVDS and the drain voltage VDS22 is obtained.

At timing T4, the second comparator 306 detects that the drain voltage VDS22 becomes equal to or higher than the second threshold voltage VthB, and asserts the OFF signal Soff. Accordingly, the Q output signal SQ is set to Low, the gate signal SG22 becomes an OFF level, and the synchronous rectification transistor M22 is turned off. At this time, the delayed signal SD becomes Low. The sampling switch SW is switched and the sample hold circuit 307C enters a sampling mode.

Thereafter, the current Is22 flows through the body diode BD2 until the current Is22 becomes zero at timing T5.

As described above, since the second threshold voltage VthB is appropriately set according to the held sampling voltage VS, namely the magnitude of the load, the synchronous rectification transistor M22 can be turned off at an appropriate timing at which the current Is22 becomes a zero current. Thus, it is possible to suppress efficiency reduction.

<Others>

While the embodiment of the present disclosure has been described above, the embodiment may be differently modified without departing from the spirit of the present disclosure.

The present disclosure can be suitably used for an LLC converter.

According to the isolated synchronous rectifying DC/DC converter of the present disclosure, it is possible to suppress efficiency reduction.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An isolated synchronous rectifying DC/DC converter configured as an LLC converter, the DC/DC converter comprising:
   a synchronous rectification transistor disposed on a secondary side of the DC/DC converter; and
   a synchronous rectification controller configured to control driving of the synchronous rectification transistor,
   wherein the synchronous rectification controller includes:
     a drain terminal connected to a drain of the synchronous rectification transistor;
     a first comparator configured to compare a drain voltage of the drain terminal with a first threshold voltage;
     a second comparator configured to compare the drain voltage of the drain terminal with a second threshold voltage;
     a flip-flop to which an ON signal output from the first comparator and an OFF signal output from the second comparator are input;
     a driver configured to output a gate signal to the synchronous rectification transistor based on an output signal of the flip-flop; and
     a threshold adjusting part configured to adjust the second threshold voltage based on the drain voltage, and
   wherein the threshold adjusting part includes a sample hold circuit configured to sample and hold the drain voltage, and is configured to adjust the second threshold voltage based on a sampling voltage output from the sample hold circuit.

2. The DC/DC converter of claim 1, wherein the threshold adjusting part further includes at a front stage of the sample hold circuit:
   a V/I conversion circuit configured to perform voltage-current conversion on the drain voltage;
   a first current mirror circuit receiving an output of the V/I conversion circuit as an input current; and
   a first resistor through which an output current of the first current mirror circuit flows.

3. The DC/DC converter of claim 1, wherein the threshold adjusting part includes a delay circuit to which an output of the flip-flop is input, and
   wherein a sampling mode and a hold mode of the sample hold circuit are switched according to a delayed signal output from the delay circuit.

4. The DC/DC converter of claim 3, wherein a delay time of the delay circuit is near half of a period of a current flowing through the synchronous rectification transistor.

5. The DC/DC converter of claim 1, wherein the synchronous rectification controller further includes a threshold setting terminal to which a setting resistor is connected,
   wherein the threshold adjusting part further includes a constant voltage circuit configured to control an output voltage to the sampling voltage, and
   wherein the output voltage is applied to the threshold setting terminal.

6. The DC/DC converter of claim 5, wherein the threshold adjusting part further includes:
   a second current mirror circuit receiving a current flowing through the setting resistor as an input current; and
   a second resistor through which an output current of the second current mirror circuit flows so that a predetermined voltage is applied to one end of the second resistor.

7. An isolated synchronous rectifying DC/DC converter configured as an LLC converter, the DC/DC converter comprising:
   a synchronous rectification transistor disposed on a secondary side of the DC/DC converter; and a synchronous rectification controller configured to control driving of the synchronous rectification transistor,
wherein the synchronous rectification controller includes:
a drain terminal connected to a drain of the synchronous rectification transistor;
a first comparator configured to compare a drain voltage of the drain terminal with a first threshold voltage;
a second comparator configured to compare the drain voltage of the drain terminal with a second threshold voltage;
a flip-flop to which an ON signal output from the first comparator and an OFF signal output from the second comparator are input;
a driver configured to output a gate signal to the synchronous rectification transistor based on an output signal of the flip-flop; and
a threshold adjusting part configured to adjust the second threshold voltage based on the drain voltage, and
wherein the threshold adjusting part is disposed between the drain terminal and the second comparator.

8. An isolated synchronous rectifying DC/DC converter configured as an LLC converter, the DC/DC converter comprising:
first and second synchronous rectification transistors disposed on a secondary side of the DC/DC converter; and
a synchronous rectification controller configured to control driving of the first and second synchronous rectification transistors,
wherein the synchronous rectification controller includes:
first and second drain terminals connected to drains of the first and second synchronous rectification transistors, respectively;
a first comparator configured to compare the drain voltages of the first and second drain terminals with a first threshold voltage;
a second comparator configured to compare the drain voltages of the first and second drain terminals with a second threshold voltage;
a flip-flop to which an ON signal output from the first comparator and an OFF signal output from the second comparator are input;
first and second drivers configured to output gate signals to the first and second synchronous rectification transistors, respectively, based on an output signal of the flip-flop;
a selector having an output terminal connected to the first and second comparators and an input terminal to which the output signal of the flip-flop is input, and configured to perform:
a first operation of switching between conduction of a path from the first drain terminal to the output terminal and conduction of a path from the second drain terminal to the output terminal; and
a second operation of switching between conduction of a path from the input terminal to the first driver and conduction of a path from the input terminal to the second driver; and
a threshold adjusting part configured to adjust the second threshold voltage based on the drain voltages.

9. The DC/DC converter of claim 8, further comprising a frequency divider configured to output a frequency divider output signal according to the output signal of the flip-flop,
wherein the selector performs the first and second operations based on the frequency divider output signal.

10. The DC/DC converter of claim 9, wherein the frequency divider output signal is switched between a high level and a low level at every falling timing of the output signal of the flip-flop.

11. The DC/DC converter of claim 8, wherein the threshold adjusting part includes a sample hold circuit configured to sample and hold the drain voltages, and is configured to adjust the second threshold voltage based on a sampling voltage output from the sample hold circuit.

12. The DC/DC converter of claim 11, wherein the threshold adjusting part further includes at a front stage of the sample hold circuit:
a V/I conversion circuit configured to perform voltage-current conversion on the drain voltages;
a first current mirror circuit receiving an output of the V/I conversion circuit as an input current; and
a first resistor through which an output current of the first current mirror circuit flows.

13. The DC/DC converter of claim 11, wherein the threshold adjusting part includes a delay circuit to which an output of the flip-flop is input, and
wherein a sampling mode and a hold mode of the sample hold circuit are switched according to a delayed signal output from the delay circuit.

14. The DC/DC converter of claim 13, wherein a delay time of the delay circuit is near half of a period of a current flowing through the synchronous rectification transistors.

15. The DC/DC converter of claim 11, wherein the synchronous rectification controller further includes a threshold setting terminal to which a setting resistor is connected,
wherein the threshold adjusting part further includes a constant voltage circuit configured to control an output voltage to the sampling voltage, and
wherein the output voltage is applied to the threshold setting terminal.

16. The DC/DC converter of claim 15, wherein the threshold adjusting part further includes:
a second current mirror circuit receiving a current flowing through the setting resistor as an input current; and
a second resistor through which an output current of the second current mirror circuit flows so that a predetermined voltage is applied to one end of the second resistor.

* * * * *